UNITED STATES PATENT OFFICE.

HUGH RODMAN, OF EDGEWOOD, PENNSYLVANIA, ASSIGNOR TO RODMAN CHEMICAL COMPANY, OF VERONA, PENNSYLVANIA, A CORPORATION OF PENNSYLVANIA.

CASE-HARDENING MATERIAL.

1,270,874.

Specification of Letters Patent.

Patented July 2, 1918.

No Drawing.

Application filed August 29, 1914. Serial No. 859,228.

*To all whom it may concern:*

Be it known that I, HUGH RODMAN, a citizen of the United States, and a resident of Edgewood, in the county of Allegheny and State of Pennsylvania, have made a new and useful Invention in Case-Hardening Material, of which the following is a specification.

This invention relates to the carburizing of steel by dry packing, and discloses a new and improved material therefor.

Charcoal, either alone or mixed with various alkaline substances, is used for carburizing steel. I find that the cellulose portions of wood, when charred, have practically no carburizing activity, while the lignose and resinous portions are active, even without addition of alkaline substances. In searching for a cheap and plentiful supply of material high in lignose and resin, or the charred products thereof, I have discovered that the material hereinafter described meets all requirements, being essentially charred lignose and resin, and moreover being available in large quantities and at low cost. It also occurs in good, mechanical condition for use as carburizing material.

This new material which is known as black ash is a by-product, or practically a by-product, of the manufacture of wood fiber, especially that made by the alkaline process, and is obtained as follows: Wood chips are digested under heat and pressure in an alkaline solution, say, sodium hydrate, until the cellulose constitutents are freed of resin and lignose, the cellulose being then washed and bleached for the production of fiber. The tarry, alkaline liquor containing the resin and lignose, (or all the wood constituents but the cellulose) is then concentrated to a heavy syrup and heated in rotary kilns to about 1400 degrees Fahrenheit. The kilned product is a heavy black charred mass, granular, consisting of a carbon sponge containing sodium carbonate and sodium hydrate. This is leached to recover the alkaline contents and the leacher residue ordinarily discarded as worthless. This leacher residue consists of a light carbon sponge which, when dry, contains several per cent. of alkali. I have discovered that these three products of fiber-making (the tarry liquid, the kilned material, and the leacher residue) are peculiarly active as carburizing materials when properly used, but I prefer the residue, as it is practically a waste product, and therefore cheap. I have, however, made excellent carburizing material by saturating ordinary wood charcoal with the liquid and by using the kilned product mixed with an equal volume of ordinary charcoal.

In using leacher residue, I prefer to first dry it, adding, if desired, an energizing agent such for example as ten per cent. of sodium carbonate or fifteen per cent. of calcium carbonate, or both, and then to screen it to the size desired. The material ordinarily occurs in the sizes most used in carburizing operations and requires no crushing. If desired, oil may be added to prevent dusting. I should add that this leacher residue, quite aside from its active carburizing qualities, would be of considerable value as a cheap, light, thoroughly charred carbon to directly replace the ordinary wood charcoal in the carburizing art, and I desire to claim its use because of that consideration, as well as because of its unique actitivy.

What I claim is:

1. The method of carburizing, which consists in packing the metal to be carburized in the by-product of fiber making, commonly known as black ash, and then in subjecting the metal and the packing material to heat.

2. A method of carburizing steel, which consists in packing the steel part to be carburized in the charred by-products resulting from the manufacture of wood fiber by the alkaline process, and then subjecting the steel part and the packing material to heat.

3. The method of carburizing which consists in packing a metal part to be carburized in a mixture of a by-product in the manufacture of wood fiber, known as black ash and an energizing agent and then subjecting the metal part and the packing to heat.

4. The method of carburizing, which consists in packing the metal part to be carburized in the charred by-product resulting from the manufacture of wood fiber and then subjecting the metal part and the packing material to a red heat.

5. The method of carburizing which consists in packing the metal part to be carburized in a mixture of the charred by-product resulting from the manufacture of wood fiber and other material and then subjecting the metal part and the mixture to a red heat.

6. The method of carburizing which consists in packing the metal part to be carburized in a mixture of the charred by-product resulting from the manufacture of wood fiber and an energizer and then subjecting the metal part and the mixture to a red heat.

7. The method of carburizing which consists in packing the metal part to be carburized in the by-product resulting from the manufacture of wood fiber, known as leacher residue, and then subjecting the metal part and the packing material to a red heat.

8. A carburizing material comprising a by-product of wood fiber manufacture known as black ash and an energizing agent.

9. Carburizing material consisting of charred resins, charred lignose and an energizing agent.

10. The method of carburizing which consists in packing a metal part to be carburized in a mixture of charred resins and lignose and then subjecting the metal part and the carburizing material to a red heat.

In testimony whereof, I have hereunto subscribed my name this 28th day of August, 1914.

HUGH RODMAN.

Witnesses:
C. W. McGhee,
E. W. McCallister.